United States Patent
Avni

(10) Patent No.: US 6,237,854 B1
(45) Date of Patent: May 29, 2001

(54) AIR CONDITIONING AUTOMATIC SHUT-OFF SYSTEM

(76) Inventor: Ed Avni, 2221 NE. 164th St. #291, N. Miami Beach, FL (US) 33160

( * ) Notice: Subject to any disclaimer, the term of this patent is extended or adjusted under 35 U.S.C. 154(b) by 0 days.

(21) Appl. No.: 09/385,503

(22) Filed: Aug. 30, 1999

(51) Int. Cl.$^7$ .................................................. G05D 23/00
(52) U.S. Cl. .............................. 236/51; 236/1 R; 165/236
(58) Field of Search .......................... 236/1 R, 51, 46 R; 62/131, 228.1; 165/237

(56) References Cited

U.S. PATENT DOCUMENTS

| | | | |
|---|---|---|---|
| 3,443,121 | 5/1969 | Weisbrod | 307/117 |
| 3,729,735 | 4/1973 | Dageford | 340/419 |
| 4,035,796 | 7/1977 | Hedly et al. | 340/417 |
| 4,223,831 | 9/1980 | Szarka | 236/47 |
| 4,232,819 * | 11/1980 | Bost | 236/47 |
| 4,338,511 | 7/1982 | Six | 219/497 |
| 4,493,100 | 1/1985 | Moriyama et al. | 381/43 |
| 4,863,099 * | 9/1989 | King et al. | 236/46 R |
| 4,948,045 * | 8/1990 | Romano | 236/51 |
| 5,341,988 * | 8/1994 | Rein et al. | 236/49.3 |
| 5,385,297 * | 1/1995 | Rein et al. | 236/49.3 |
| 5,390,206 * | 2/1995 | Rein et al. | 375/1 |
| 5,476,221 * | 12/1995 | Seymour | 236/47 |

* cited by examiner

Primary Examiner—William Wayner
(74) Attorney, Agent, or Firm—Oltman, Flynn & Kubler

(57) ABSTRACT

According to the invention there is provided a temperature-controlled system for at least one temperature controlled space having at least one closeable opening leading to a non-temperature controlled space, a closing element having an open or closed state filling the opening, and an open/closed sensor connected with said closing element for indicating an open/closed state of the closing element; heating-cooling supply means in the temperature controlled space for supplying heating-cooling thereto; temperature controlling means in the temperature controlled space in operative engagement with the heating-cooling supply means, for controlling the heating-cooling supply therein, and an operative connection from the open/closed sensor to the temperature controlling means for stopping supply of heating/cooling when the closing element is open, and wherein the operative connection includes a radio frequency transmitter coupled to the open/closed sensor, and a radio frequency receiver tuned to the radio frequency transmitter in operative engagement with the temperature controlling means. According to a further feature, there is provided a system wherein the operative connection includes a metallic pair of wires.

12 Claims, 5 Drawing Sheets

AIR CONDITIONING AUTOMATIC SHUT-OFF SYSTEM

The invention relates to a system for automatically shutting off air conditioning to a room when a window or door leading to an uncooled area is opened, in order to conserve energy.

BACKGROUND AND PRIOR ART

In recent years increased interest and efforts have been exerted in order to avoid waste of energy both for cooling and heating of homes and buildings. It has been noted that a case of energy waste obtains when a heated or cooled room is thrown open to the environment, e.g. by opening windows or doors without turning off the source of heating and cooling.

This applies to both residential and even more to public buildings where considerable amounts of energy can be wasted by carelessly throwing open large windows and doors in large rooms without turning off the heating or cooling supply for that room.

A body of prior art addressing this problem has been uncovered by applicant. In particular, U.S. Pat. No. 3,729,735 relates to a remote ultrasonic sending device for air conditioners, which discloses a remote sending device controlled by opening or closing of a window by means of a window actuator connected to an ultrasonic transmitter using one or more tuning forks to control a motor switch to activate or deactivate a blower motor of an air-conditioning system for a given area. This arrangement has the drawbacks that very large or noisy rooms may create interference with a system which is based on acoustic signaling, and that acoustic signals may be obstructed by curtains, walls, etc.

U.S. Pat. No. 4,223,831 provides a system wherein the environmental temperature in an area is controlled by the detection of the presence or absence of personnel in a room. A microphone detects sounds in the room and actuates a control circuit to establish a set point for a temperature system which supplies heating and cooling to the room. The presence of people in the room is accompanied by sounds which are detected by the microphone to set the set point at an appropriate temperature to provide a comfortable environment. The absence of sound permits a new set point to be used to reduce the energy consumption of the heating or cooling system. A time delay circuit is optionally incorporated to eliminate undesirable cycling.

U.S. Pat. No. 4,493,100 shows a system wherein voice commands of two types are recognized by an air conditioner; a first command to jump to a different air delivery temperature, after which a gradual automatic return to the previously set temperature occurs, or a second command which will stop the automatic return at some arbitrary temperature.

U.S. Pat. No. 4,035,796 shows a system which includes a simple apparatus for turning off a heating or air conditioning unit when a door or window is opened. Switches activated by the opening of doors or windows control the operation of a heater or air conditioner through a relay system that doubles as a burglar alarm when an alarm circuit is activated.

None of the prior art known to applicant provides features shown by applicant, namely a system which is readily suitable for large as well as small buildings, and has a high degree of safety against an unwanted operation caused by acoustic or other kinds of interference.

SUMMARY OF THE INVENTION

According to the invention there is provided a temperature-controlled system for at least one temperature controlled space having at least one closeable opening leading to a non-temperature controlled space, a closing element having an open or closed state filling the opening, and an open/closed sensor connected with said closing element for indicating an open/closed state of the closing element; heating-cooling supply means in the temperature controlled space for supplying heating-cooling thereto; temperature controlling means in the temperature controlled space in operative engagement with the heating-cooling supply means, for controlling the heating-cooling supply therein, and an operative connection from the open/closed sensor to the temperature controlling means for stopping supply of heating/cooling when the closing element is open, and wherein the operative connection includes a radio frequency transmitter coupled to the open/closed sensor, and a radio frequency receiver tuned to the radio frequency transmitter in operative engagement with the temperature controlling means.

According to a further feature, there is provided a system wherein the operative connection includes a metallic pair of wires.

According to still another feature, the open/closed sensor includes a magnet attached to the closing element and a ferro-magnetic reed relay fixedly disposed proximal to the magnet when the closing element is in closed condition, and wherein further the open/closed sensor includes a code generator for generating a space code identifying the temperature controlled space in response to opening of the closing element.

According to an additional feature the system includes a space code receiver coupled to the temperature controlling means being uniquely responsive to the space code for stopping the supply of heating/cooling only when the particular space code is received, and wherein further, the system includes a plurality of temperature controlled spaces, each plurality forming a temperature controlled zone of temperature controlled spaces, wherein the space code is common to all of the temperature controlled spaces forming temperature controlled space zone, and wherein further the temperature controlling means includes a thermostat having a manual input for manually controlling the temperature in the temperature controlled space, the thermostat having an overriding disabling input connected to the open/closed sensor for overridingly stopping supply of heating/cooling in response to the closing element being opened.

According to another feature of the invention there is provided a system wherein the reed relay includes a counter-biasing magnet proximal to the reed relay for maintaining the reed relay in open condition when the closing element is in closed condition, and wherein further the radio-frequency transmitter includes a power input, e.g. a battery for providing operating power for the transmitter, and a battery-saving input to the transmitter wherein the battery is connected to the power input via the reed relay, and further including a delay circuit for supplying a delayed start signal for the transmitter, and wherein additionally a plurality of transmitters are commonly connected to a battery, and wherein the transmitter includes a manually operable code switch for inserting a space code into the transmitter.

According to again another feature, the transmitter includes a universal synchronous-asynchronous receive-transmit circuit for generating an asynchronous transmit code, a common monitor radio receiver tuned to the transmitter, and a code display for displaying a zone code for an active transmitter.

Further objects and advantages of this invention will be apparent from the following detailed description of a presently preferred embodiment, shown schematically in the accompanying drawings.

DESCRIPTION OF THE PREFERRED EMBODIMENTS

Figure 1:
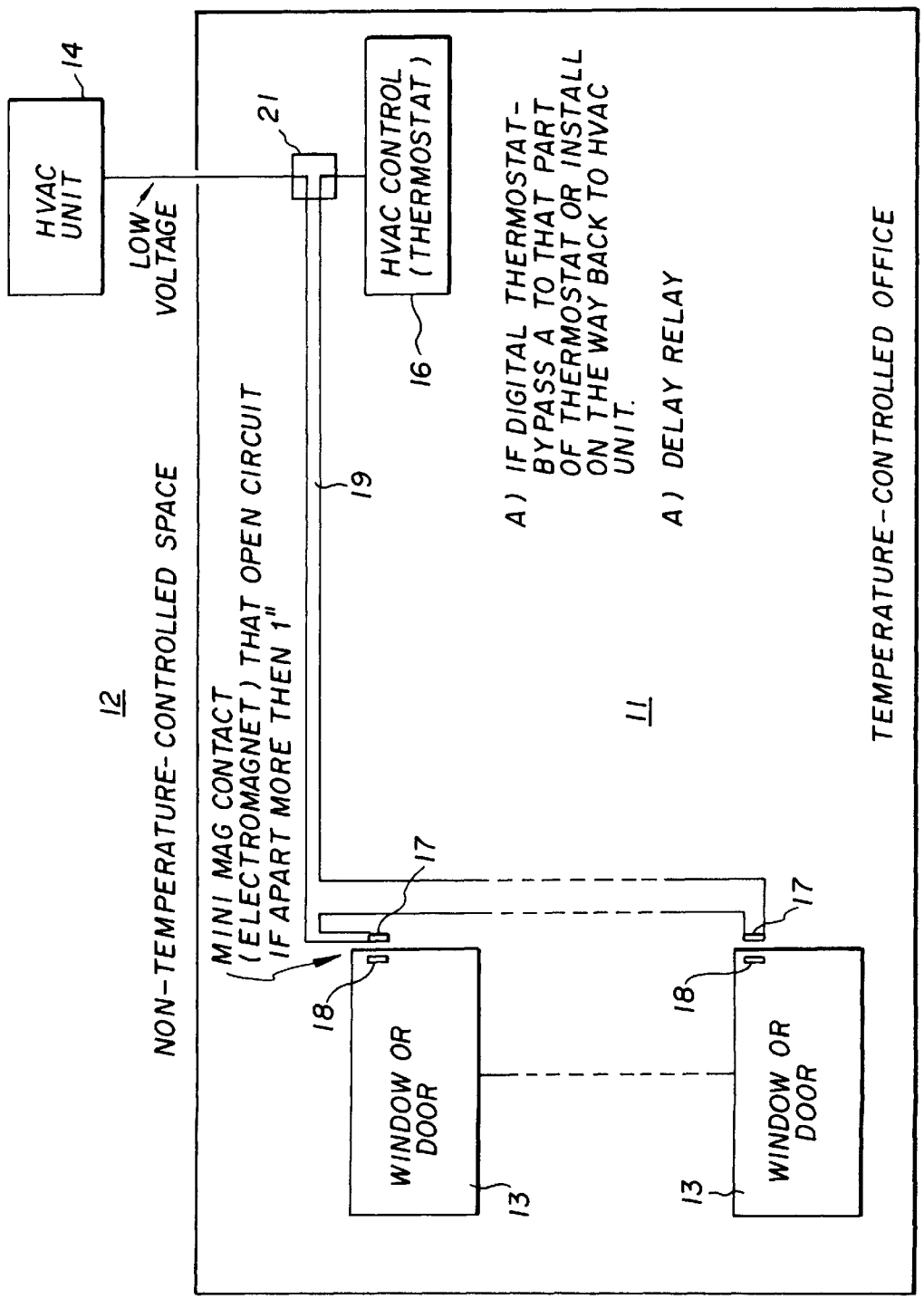
FIG. 1 is a block diagram showing a basic version of the invention as applicable to a single or a few rooms, based on wired connections.

FIG. 1 shows in diagrammatic form a temperature-controlled space 11. The space 11 may be a single room, or a group of rooms in e.g. an apartment or office complex or the like, disposed within or in proximity to a non-temperature controlled space 12, which could be an open-air space or e.g. a utility space within a larger apartment, factory or office complex. The temperature controlled space I 1 will typically have a plurality of windows and/or door openings 13 that lead to the non-temperature-controlled space 12. Theses openings will typically be equipped with hinges, so that they can be opened to the non-temperature controlled space 12 in order to provide fresh air or to provide an escape facility in case of danger.

Normally it would be prudent, when opening the door or window 13, to shut off the heating and/or cooling system 14 at the thermostat 16. The occupants of space 11 may, however, neglect to shut off the heating and/or cooling system 14, thereby causing loss and waste of heating and/or cooling energy.

In order to avoid such waste there is provided in accordance with the inventive concept an electric switch 17 on the wall adjacent to each of the windows or doors 13. The electric switch 17 interacts with the door or window 13 by means of e.g. a small magnet 18 mounted on the door or window adjacent to the switch 17 such that the switch contacts open the circuit when the door or window is opened. The switches 17 are series connected as shown.

The switches 17 communicate in this case via a connection 19 with a disconnect switch 21 located between the heating/cooling unit 14 and the thermostat 16. Upon opening the door or window 13 the disconnect switch 21 is activated and stops the heating/cooling unit 14 from operating and wasting fuel.

Under many circumstances the space 11 will typically be not just a single room but a plurality of rooms forming e.g. an apartment, a residence in a house, an office complex or an office/manufacturing complex, or the like. In such cases all the windows and doors 13 will have the respective switches 17 series-connected forming a loop, the two ends of which will be connected back to switch 21 to stop the heating or cooling when one of the openings 13 is opened. Such an arrangement may lead to a considerable amount of wiring, which is not always desirable in an office or residential environment.

Figure 2:
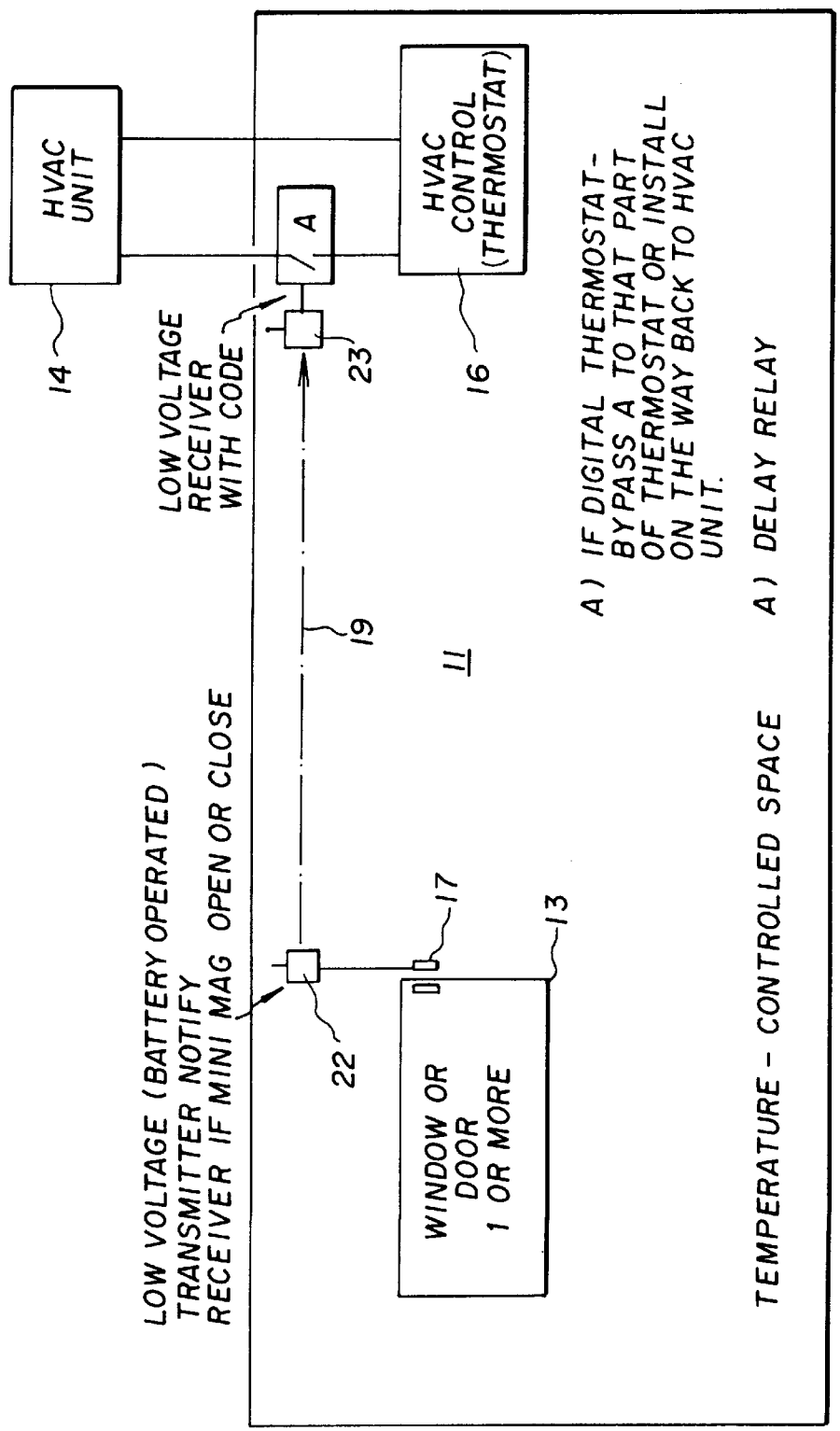
FIG. 2 shows a version of the invention directed to an application based on a wireless connection.

As an alternative to the wiring described above, instead, as seen in FIG. 2, a small radio transmitter 22 may be connected to each of the switches 17, and a suitable radio frequency receiver 23 will be connected to the disconnect switch 21 to stop heating or cooling if one of the openings 13 is opened.

As contemplated, the radio sender 22 is a small simple battery-operated transmitter that transmits a signal activating the receiver 23 when a door or window is opened. In this mode it is an important consideration that the standby current drain on the battery is as low as possible, preferably zero. One such arrangement of the transmitter is shown in FIG. 3.

Figure 3:
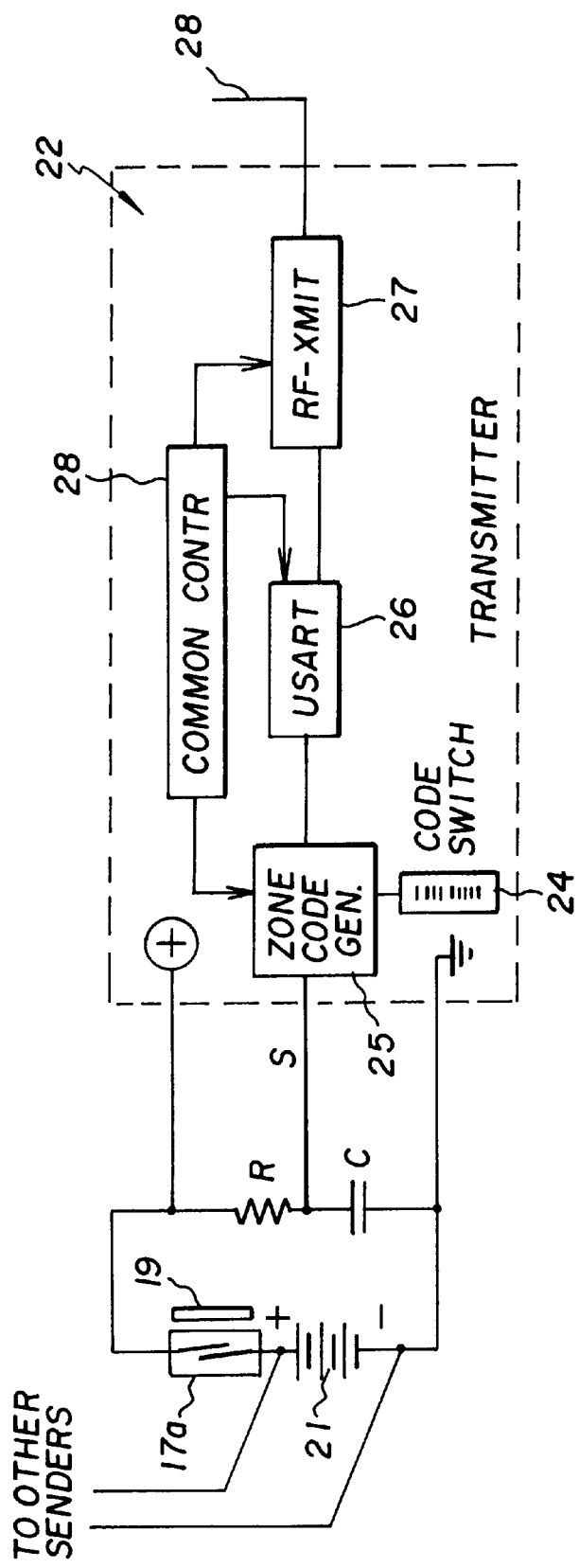
FIG. 3 is a block diagram showing a wireless zone code sender having zero battery drain in the idle state.

In this arrangement the switch 17, shown in FIG. 3 as 17a, is arranged to close its contacts when the door or window 13 is opened. This can be done in many well-known ways, e.g. by providing a small bias magnet 19 attached adjacent to the switch 17a, which negates the magnetic force of the above-mentioned door-mounted magnet 18 so that when the window or door 13 is closed, contacts 17a are open, and when the window or door is open the contacts of switch 17a are closed, and the battery 21 is connected to the transmitter 22.

When a door or window 13 is opened, and the switch contacts 17a closed, the battery is connected to the radio sender circuit's plus terminal and is energized, the sender 22 is powered up. A delayed start signal is generated by the R, C circuit, and a start signal is applied to the circuit's start terminal S.

In case the sender 22 is used in a large complex with many rooms that are arranged in zones, all senders 22 may first transmit a zone code which uniquely identifies each zone. A zone code generator 25 connected to a code switch 24 generates a code as entered into the code switch 24. The unique zone code is converted to e.g. ASCII code in a code converter 26, which may be of well-known construction such as USART 26 ("Universal-Synchronous-Asynchronous-Receive-Transmit code"), which in turn converts the zone code to standard ASCII transmission, which is next applied to the input of the RF-XMIT circuit 27, connected to a transmit antenna 28 for transmission to the radio receiver 23 in FIG. 2. Upon opening of a door or window within the activating zone. The elements of the sender 22 are controlled by a common control circuit, which operates as a controlling sequencer in accordance with the steps shown in flow chart, FIG. 5.

Figure 4:
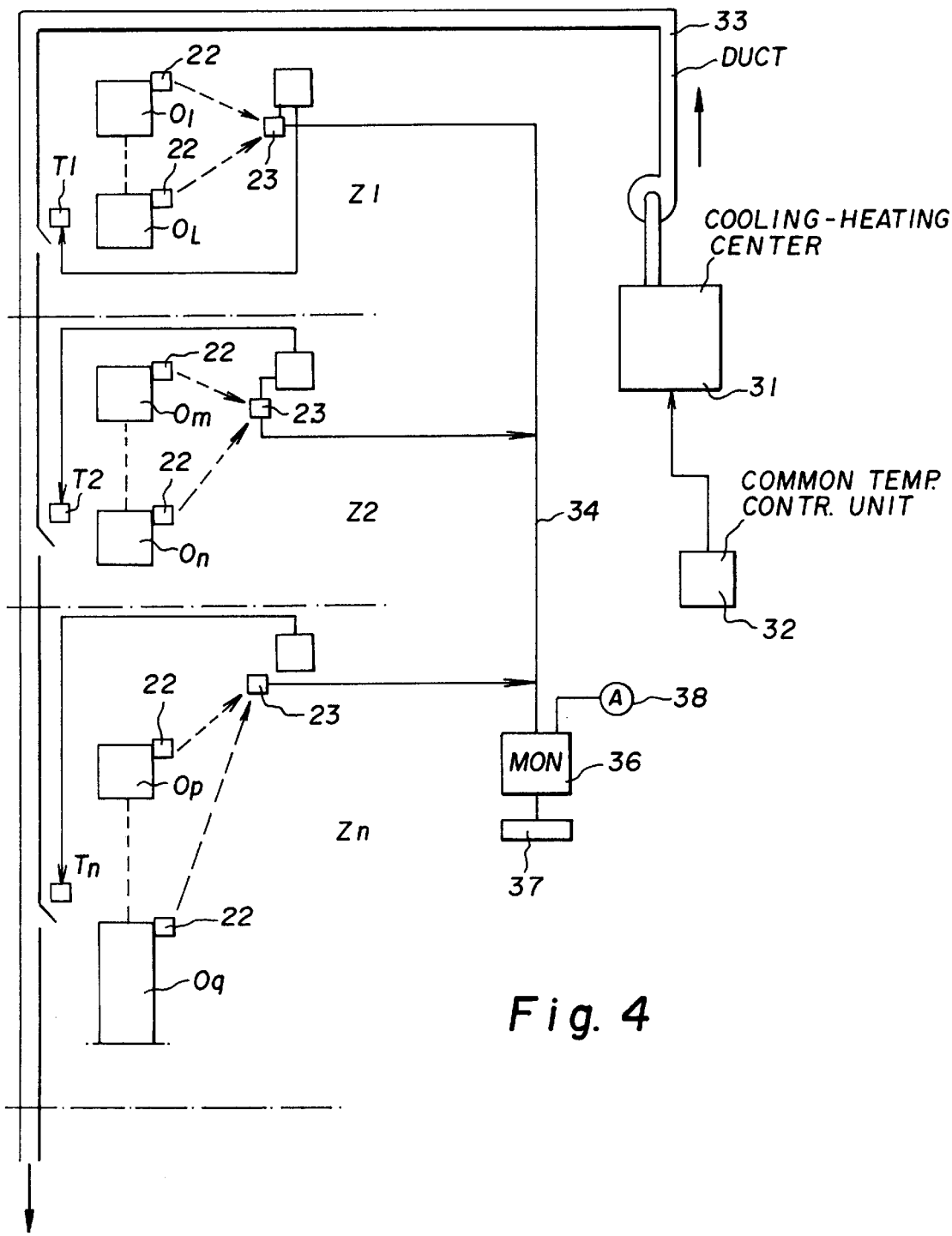
FIG. 4 shows a multi-user application of the invention.

The use of zone codes is important in large installations with many rooms, organized in zones, such as indicated in FIG. 4, in order to enable a service person to quickly find the particular zone-controlled space, generating the open window, door signal.

FIG. 4 shows a complex composed of e.g, three (3) zones z1,z2,zn . . . which may be part of a large organization divided into offices, shops, store rooms, etc.

The entire complex is heated and/or cooled by a central cooling heating center controlled by a common temperature control 32. A heating and/or cooling medium is transmitted via a duct system to zones z1 . . . zn, which each has an individual thermostat $T_1, T_2, \ldots T_n$. Each zone z1 . . . zn has a number of door and window openings $o_1-o_6, o_m-o_n, o_p-o_q$, etc., which are equipped with a transmitter 22 transmitting to a respective zone receiver 23. The zone receivers 23 are connected via connection 34 to a common monitor station MON (36), having a display 37 which displays the zone code for the transmitting zone code. An alarm 38 may summon an attendant, who can check the indicated zone for an open door or window.

Figure 5:
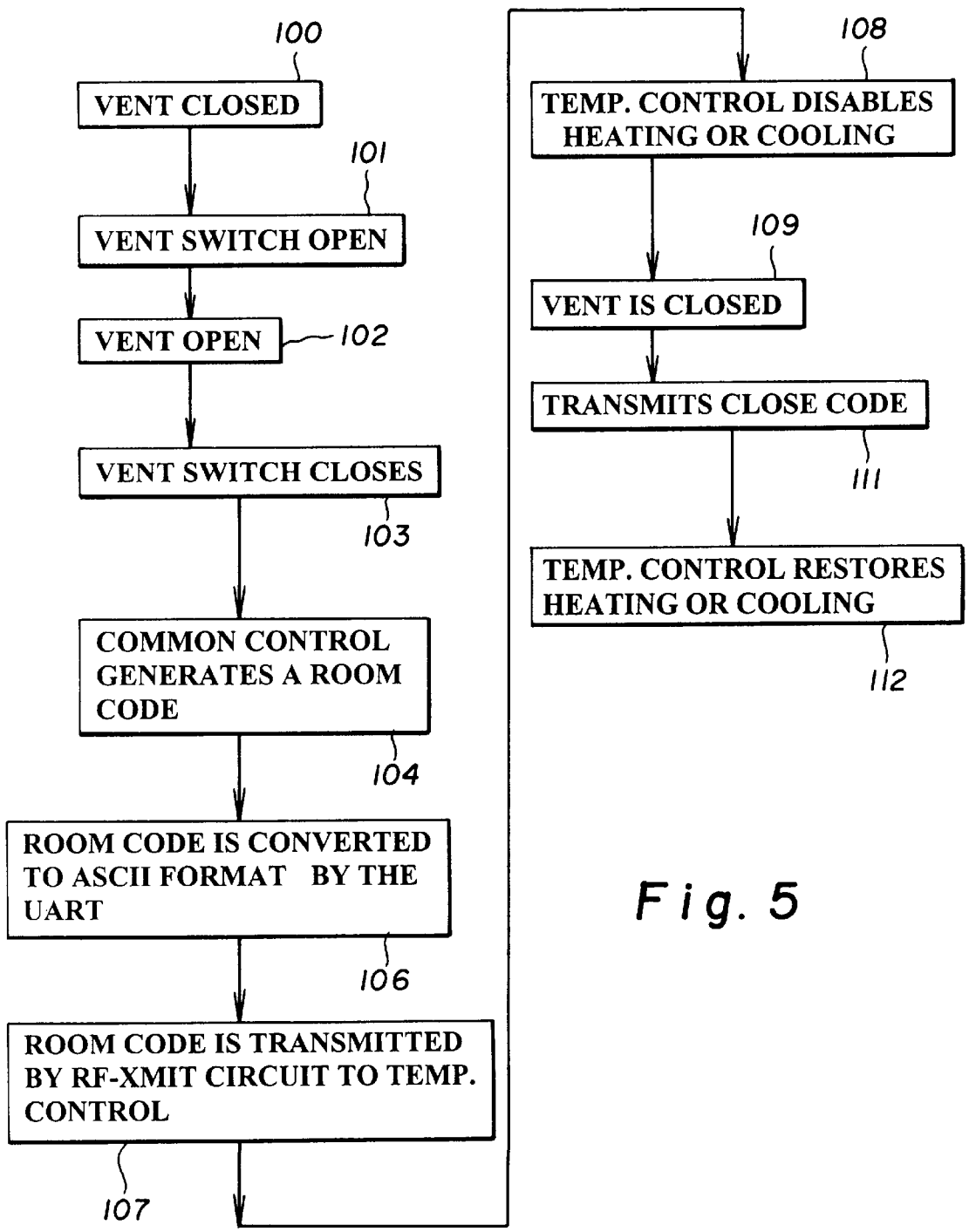
FIG. 5 is a flow-chart showing the steps of operation of the system according to FIG. 4.

FIG. 5 is a block diagram showing the steps being performed during operation of the invention, wherein step 100 shows the vent(s) closed, and 101 shows the vent switch being open. In step 102 the vent is opened with the result that the vent switch closes in step 103, which activates the transmitter, causing the common control to generate a room code in step 104 for the room or room zone with the open vent. In step 106 the room or zone code is converted to e.g. ASCII code by a UART. In step 107 the room code is transmitted to the temperature control, disables the heating or cooling in step 108, and subsequently a person is summoned, who closes the vent in step 109. In step 109, the transmitter may optionally transmit a close code as shown in step 111, with the result that in step 112 the temperature controls are restored.

I claim:

1. A temperature control system for at least one temperature controlled space having at least one closeable opening leading to a non-temperature controlled space, a closing element having an open or closed state filling said opening, and an open/closed sensor connected with said closing element for indicating an open/closed state of said closing element; heating-cooling supply means in said temperature controlled space for supplying heating-cooling thereto; temperature controlling means in said temperature controlled space in operative engagement with said heating-cooling supply means, for controlling the heating-cooling supply therein, and an operative connection from said open/closed sensor to said temperature controlling means for stopping supply of heating/cooling when said closing element is open, and wherein said operative connection includes a radio frequency transmitter coupled to said open/closed sensor, and a radio frequency receiver tuned to said radio frequency transmitter in operative engagement with said temperature controlling means, wherein said open/closed sensor includes a code generator for generating a space code identifying said temperature controlled space in response to opening of said closing element.

2. A system according to claim 1, wherein said operative connection further includes a metallic pair of wires.

3. A system according to claim 1, wherein said open/closed sensor includes a magnet attached to said closing element and a ferro-magnetic reed relay fixedly disposed proximal to said magnet when said closing element is in closed condition.

4. A system according to claim 3, wherein said reed relay includes a counter-biasing magnet proximal to said reed relay for maintaining said reed relay in open condition when said closing element is in closed condition.

5. A system according to claim 1, including a space code receiver coupled to said temperature controlling means being uniquely responsive to said space code for stopping said supply of heating/cooling only when said space code is received.

6. A system according to claim 5, including a plurality of temperature controlled spaces, each plurality forming a temperature controlled zone of temperature controlled spaces, wherein said space code is common to all of said temperature controlled spaces forming temperature controlled space zone.

7. A system according to claim 1, wherein said temperature controlling means includes a thermostat having a manual input for manually controlling the temperature in said temperature controlled space, said thermostat having an overriding disabling input connected to said open/closed sensor for overridingly stopping supply of heating/cooling in response to said closing element being opened.

8. A system according to claim 1, including a common monitor radio receiver tuned to said transmitter, and a code display for displaying a zone code for an active transmitter.

9. A temperature control system for at least one temperature-controlled space having at least one closeable opening leading to a non-temperature controlled space, a closing element having an open or closed state filling said opening, and an open/closed sensor connected with said closing element for indicating an open/closed state of said closing element; heating-cooling supply means in said temperature controlled space for supplying heating-cooling thereto; temperature controlling means in said temperature controlled space in operative engagement with said heating-cooling supply means, for controlling the heating-cooling supply therein, and an operative connection from said open/closed sensor to said temperature controlling means for stopping supply of heating/cooling when said closing element is open, and wherein said operative connection includes a radio frequency transmitter coupled to said open/closed sensor, and a radio frequency receiver tuned to said radio frequency transmitter in operative engagement with said temperature controlling means, wherein said open/closed sensor includes a magnet attached to said closing element and a ferro-magnetic reed relay fixedly disposed proximal to said magnet when said closing element is in closed condition, wherein said reed relay includes a counter-biasing magnet proximal to said reed relay for maintaining said reed relay in open condition when said closing element is in closed condition, and wherein said radio-frequency transmitter includes a power input, a battery for providing operating power for said transmitter, and a battery-saving input to said transmitter wherein said battery is connected to said power input via said reed relay, and further including a delay circuit for supplying a delayed start signal for said transmitter.

10. A system according to claim 9, wherein a plurality of transmitters are commonly connected to a battery.

11. A system according to claim 10, wherein said transmitter includes a manually operable code switch for inserting a space code into said transmitter.

12. A system according to claim 11, wherein said transmitter includes a universal synchronous-asynchronous receive-transmit circuit for generating an asynchronous transmit code.

\* \* \* \* \*